United States Patent [19]
Kuroishi et al.

[11] Patent Number: 5,778,202
[45] Date of Patent: Jul. 7, 1998

[54] RING BUS MULTIPROCESSOR SYSTEM AND PROCESSOR BOARDS FOR CONSTITUTING THE SAME

[75] Inventors: Norihiko Kuroishi; Tetsuro Kawata; Kenichi Kawauchi; Nobuaki Miyakawa, all of Nakai-machi; Reiji Aibara, Higashi-Hiroshima; Mitsumasa Koyanagi, Sendai, all of Japan

[73] Assignee: Fuji Xerox Co., Ltd., Tokyo, Japan

[21] Appl. No.: 662,445

[22] Filed: Jun. 10, 1996

[30] Foreign Application Priority Data

Jun. 13, 1995 [JP] Japan ................................. 7-145945

[51] Int. Cl.$^6$ .............................. G06F 13/00; G06F 13/38
[52] U.S. Cl. ........................ 395/306; 395/281; 395/311; 395/200.81; 395/800
[58] Field of Search .............................. 395/281, 282, 395/306, 311, 200.81, 800

[56] References Cited

U.S. PATENT DOCUMENTS

| | | | |
|---|---|---|---|
| 4,667,287 | 5/1987 | Allen et al. | 395/200.64 |
| 5,113,525 | 5/1992 | Colley et al. | 395/800 |
| 5,359,714 | 10/1994 | Avaneas | 395/281 |
| 5,488,705 | 1/1996 | LaBarbera | 395/306 |

OTHER PUBLICATIONS

Institute of Electronics, Information and Communication Engineers, Technical Report of IEICE, VLD 93–99, ICD 93–194, (1993–03), "Topdown Design of a Monte Carlo Device Simulation Processor with Hardware Description Language", Norihiko Kuroishi et al., 8 pages. Abstract— Only part W/ English Translation.

Primary Examiner—Jack B. Harvey
Assistant Examiner—Jeffrey K. Seto
Attorney, Agent, or Firm—Oliff & Berridge PLC

[57] ABSTRACT

A ring bus multiprocessor system whose processors are laid out and connected in such a manner that the system is enhanced in stability and performance, is easy to modify in scale, and is lowered in manufacturing cost. On a processor board, processors are serially connected by communication buses to form a processor group. Each processor board may have an even-numbered plurality of processor groups mounted thereon. A plurality of processor boards are laid out in parallel and are interconnected between adjacent boards by means of inter-processor communication buses. Each of the odd-numbered processor groups is connected from one board to the next up to the most downstream board where the connection is looped back to the adjacent even-numbered processor group. In turn, the even-numbered processor group is connected from one board to the next back to the most upstream board where the connection is again looped back to the adjacent odd-numbered processor group, and so on, whereby a ring bus arrangement is formed.

13 Claims, 7 Drawing Sheets

RING BUS MULTIPROCESSOR SYSTEM AND PROCESSOR BOARDS FOR CONSTITUTING THE SAME

BACKGROUND OF THE INVENTION

1. Field of the Invention

The present invention relates to a multiprocessor system having a plurality of processors connected and, more particularly, to a ring bus multiprocessor system having a plurality of processors connected in ring-like fashion through a ring type communication bus arrangement permitting unidirectional data communication between the processors.

2. Description of the Related Art

Figure 5:
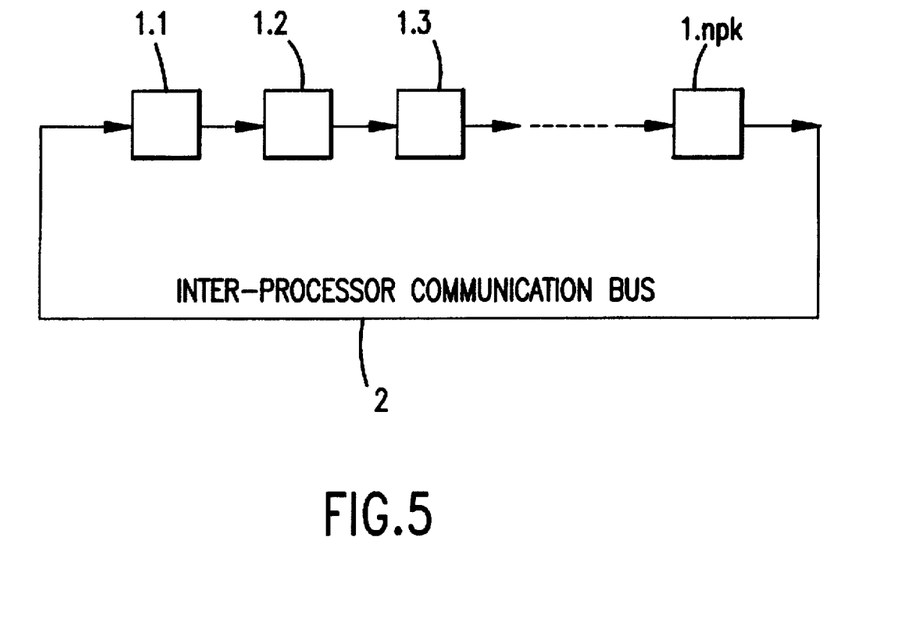
FIG. 5 is a conceptual view of a typical ring bus multiprocessor system.
Figure 6:
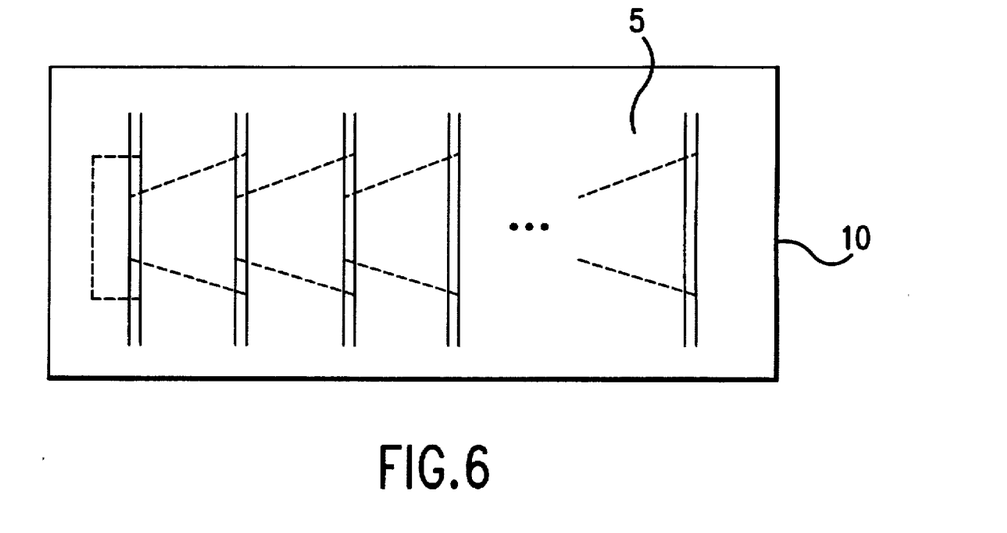
FIG. 6 is a schematic view of a typical back plane board used in the second embodiment.

A variety of multiprocessor systems have been proposed using a plurality of processors each. One such multiprocessor system is a ring bus multiprocessor system having a plurality of processors connected in ring-like fashion. FIG. 5 is a conceptual view of a typical ring bus multiprocessor system. In FIG. 5, reference numerals 1.1 through 1.npk represent processors. Of the n×p×k processors 1.1 through 1.npk in the multiprocessor system of FIG. 5, adjacent processors 1.i and 1.i+1 are interconnected by a unidirectionally communicative inter-processor communication bus, and processors 1.npk and 1.1 are connected in end-to-end fashion also by a unidirectionally communicative inter-processor communication bus, whereby a ring type connection setup is formed.

Figure 7:
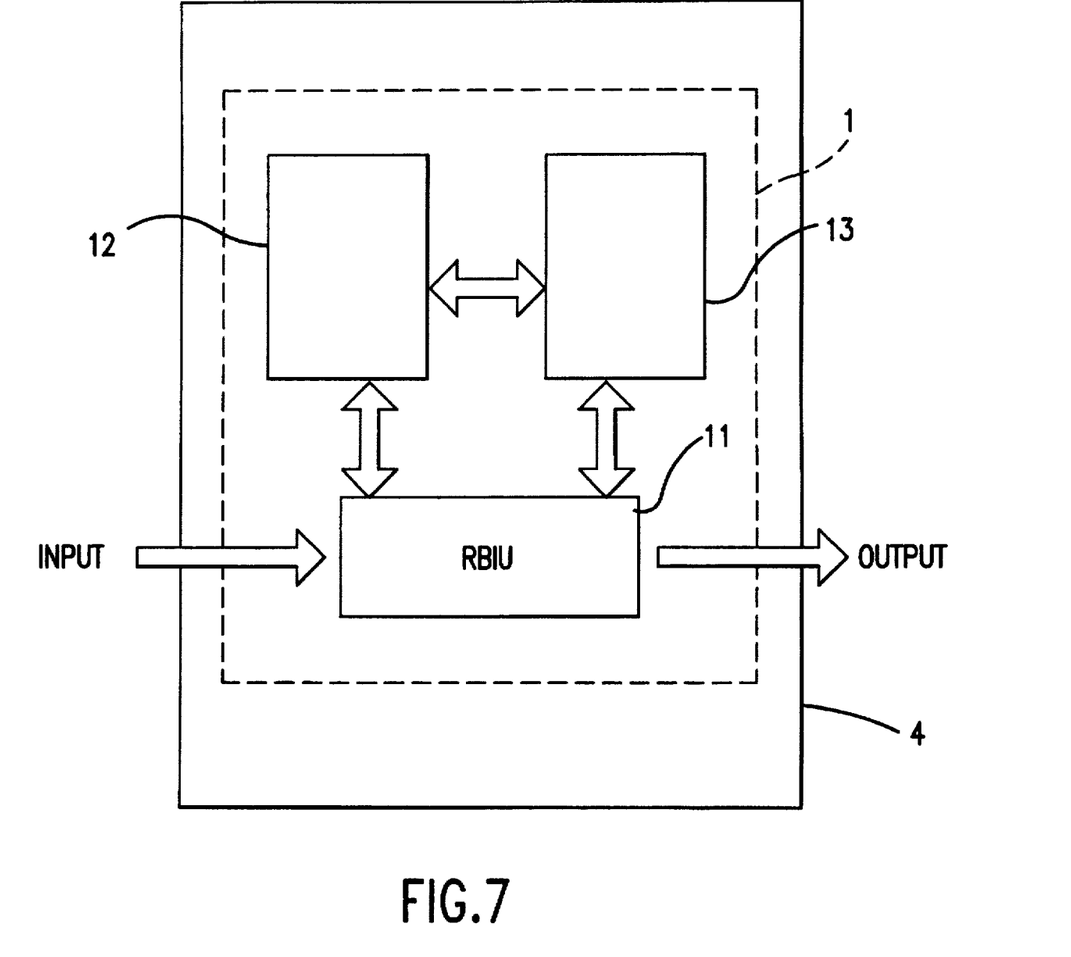
FIG. 7 is a block diagram of a typical processor board for use in ring bus multiprocessor systems.

FIG. 7 is a conceptual view showing the typical constitution of one of the processors making up a ring bus multiprocessor system. Each processor 1 comprises a ring bus interface unit 11 for transmitting or receiving data unidirectionally, a computing unit 12 and a memory unit 13. The memory unit 13 retains numbers to be computed, arithmetic instructions and other data and may be connected to an external memory, not shown, via a data bus. The ring bus interface unit 11 is arranged to process messages independently of the computing by the computing unit 12. The computing unit 12 operates on the data transmitted through the ring bus interface unit 11. The transmitted data include computed results from another processor and arithmetic instructions.

Although not shown in FIG. 7, an alternative processor may have a common processing circuit performing both the function of the computing unit and that of the ring bus interface unit so as to extract only the data relevant to the processor in question and allow the remaining data to pass through. In such a case, the processing speed may be reduced depending on the kind of processing because computing and communication cannot be handled independently of each other.

In the multiprocessor setup, the processors 1.1 through 1.n perform their computations independently of one another and transfer their respective results of computing from one processor to another. This allows high-speed parallel computations to be carried out.

To take advantage of their characteristics, ring bus multiprocessor systems have been proposed for use illustratively in simulating multiple particle movements that require computing interactions among numerous particles at high speed. One such system is discussed in "Top-down Design of a Monte Carlo Device Simulation Processor with Hardware Description Language," the Institute of Electronics, Information and Communication Engineers, Technical Report of IEICE, VLD 93–99, ICD 93–194 (1993-03).

A ring bus multiprocessor system may utilize a plurality of detachable processor boards 4 (FIG. 7) each carrying a processor 1. The configuration of such a system is modified easily by adding or removing the processor boards in order to vary the number of processors depending on the type of computation or on the operation speed required for specific computation.

Figure 8:
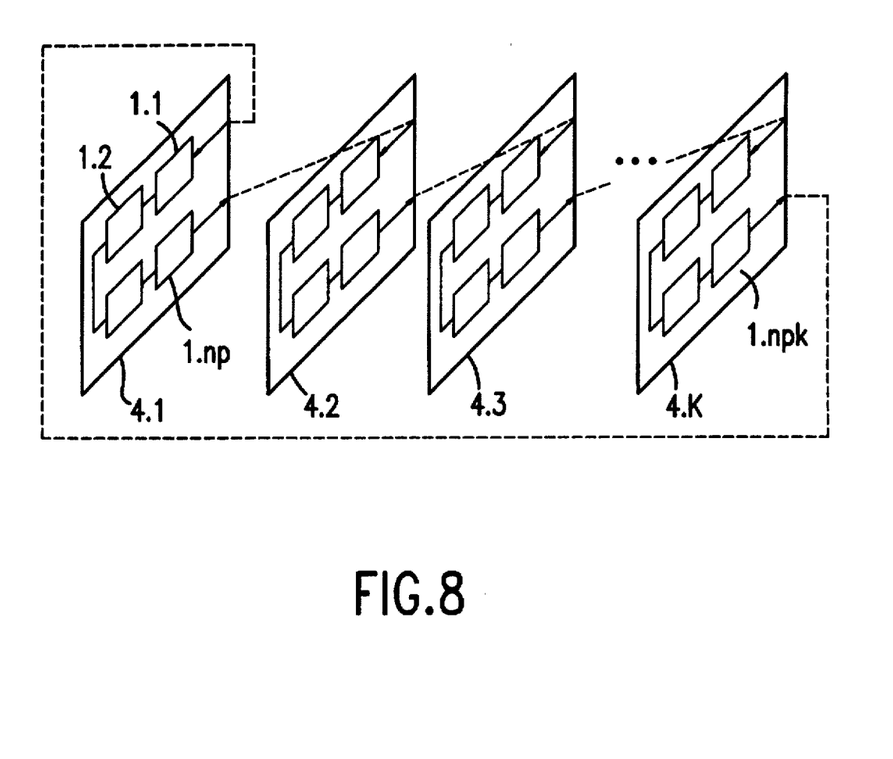
FIG. 8 is a schematic view showing how a conventional ring bus multiprocessor system is constituted.

In building the multiprocessor system of FIG. 5, the method of FIG. 8 may illustratively be conceived for mounting components of the system. In the example of FIG. 8, each of k processor boards 4.1 through 4.k has n×p processors 1.1 through 1.np mounted thereon, and the processors are connected in linear fashion. Thus the processors 1.1 and 1.np have an input or output terminal each. In the setup of FIG. 8, the processor 1.1 has the input terminal and the processor 1.np has the output terminal. The output terminal of the processor board 4.i is connected to the input terminal of the adjacent processor board 4.i+1, and the output terminal of the processor board 4.k is connected to the input terminal of the processor board 4.1. That ring-like connection constitutes a multiprocessor system such as the one in FIG. 5.

The representative system in FIG. 8 has some disadvantages. For one thing, the signal line connecting the processor board 4.k at the last stage to the processor board 4.1 is considerably greater in physical length than the inter-processor communication bus between other processor boards, and especially between processors on each processor board. This leads to a decline in system performance and degradation in operation stability.

Another disadvantage of the example in FIG. 8 concerns the customary arrangement in which the inter-processor communication buses connecting processor boards are laid out on a so-called back plane board. In the setup of FIG. 8, special wiring is furnished on the back plane for connecting the processor boards at both extreme ends of the processor boards configured. This means that once the system is established, any subsequent attempt to change the scale of the system (i.e., to make it larger or smaller) requires redesigning the back plane board. This is a costly practice that takes time to accomplish.

SUMMARY OF THE INVENTION

It is therefore an object of the present invention to provide a ring bus multiprocessor system whose processors are laid out and connected in such a manner that the system is enhanced in stability and performance, is easy to modify in scale, and is lowered in manufacturing cost.

In carrying out the invention and according to a first aspect thereof, there are provided A processor board for a ring bus multiprocessor system comprising: a board and an even number of processor groups wherein each of said processor group having at least one processor and only one pair of an input terminal and an output terminal on a edge of said board to transmit a data processed by said processor, and if said processor group has a plurality of said processor, said processors of said processor group are serially interconnected.

According to a second aspect of the invention, there is provided a ring bus multiprocessor system comprising: a plurality of processor board for a ring bus multiprocessor system including a board and an even number of processor groups wherein each of said processor group having at least one processor and only one pair of an input terminal and an output terminal on a edge of said board to transmit a data processed by said processor, and if said processor group has a plurality of said processor, said processors of said processor group are serially interconnected; a group of wiring interposed between two adjacent processor boards of said plurality of processor boards and connecting said output terminal of one of said two adjacent processor boards and said input terminal of the other of said two adjacent processor boards; and an end wiring interposed between an output terminal of one of said processor groups and an input terminal of the other of said processor group of each of said processors boards locating at each side of said plurality of said processor boards; wherein said processors included in said plurality of processor boards are interconnected to furnish a ring bus arrangement.

When a plurality of processors are connected in ring-like fashion to form a multiprocessor system, the performance of the system is rendered higher the shorter the connection distance between adjacent processors and especially between adjacent processor boards. A minimum of processor board types should preferably be used to keep the manufacturing cost of the system from rising. In addition, the system, once established, should preferably be modified easily in scale in keeping with any subsequent changes of applications or with the kind of tests to be run on the system.

The embodiment of the invention according to the first aspect thereof comprises a plurality of processor boards each comprising a board and an even number of processor groups wherein each of said processor group having at least one processor and only one pair of an input terminal and an output terminal on a edge of said board to transmit a data processed by said processor, and if said processor group has a plurality of said processor, said processors of said processor group are serially interconnected. In such a setup, the processor boards are interconnected only between adjacent processor boards. This means that the physical distance of connection between the processor boards is not inordinately greater than the physical distance of communication bus connection between processors on each processor board. The setup keeps approximately constant the delay times in signal propagation between the processors as well as between the processor boards. This leaves no problem regarding the supply of signals such as the system clock susceptible to delay time dispersion. As a result, the system operates stably, protected against decline in performance. Since the processor boards constituting the system are interconnected only between adjacent boards, it is easy to modify the system in scale. When component processor boards are standardized, they can make up a low-cost multiprocessor system.

In a preferred structure according to the invention, the input and output terminals of each of the processor groups are located on the same edge of each of the processor boards. The structure facilitates connection between the processor boards illustratively by means of a back plane board. Because only adjacent processor boards are interconnected by wiring on the back plane board, the structure is simple and easy to design. If all processor boards are standardized to have the same constitution, the design and manufacturing costs of the system made up of such boards can be held low. The preferred structure also facilitates any subsequent changes of the system configuration.

In another preferred structure according to the invention, a switch is furnished interposingly between two different processor groups. This switch is used to make and break the connection between the input terminal of one of the two processor groups and the output terminal of the other processor group. Illustratively, the switch is closed where the processor groups are interconnected between the processor boards at both extreme ends of the configured processor boards; the switch is left open where processor groups are not interconnected. In a typical setup utilizing a back plane board, the structure above eliminates the need to furnish wiring to interconnect the processor groups at both extreme ends of the configured processor boards, whereby the wiring pattern of the back plane board is further simplified. The structure thus allows the system to be modified in scale without redesigning the back plane board. In addition, it is possible to standardize all processor boards including those at both extreme ends so that they all share the same constitution, which lowers the cost of processor board fabrication.

Other objects and further features of the invention will be apparent from the following detailed description when read in conjunction with the accompanying drawings.

DESCRIPTION OF THE PREFERRED EMBODIMENTS

FIGS. 1A through 1D are schematic block diagrams of a ring bus multiprocessor system practiced as the first embodiment of the invention. In the figures, reference numerals 1.1 through 1.n are processors; 2.1 through 2.n–1 and 5 are inter-processor communication buses; 3 and 3.1 through 3.2m are processor groups; 4 and 4.1 through 4.k are processor boards; 6 is an input terminal; and 7 is an output terminal. These are the components that illustratively constitute the typical unidirectional ring bus multiprocessor system shown in FIG. 5.

Figure 1A:
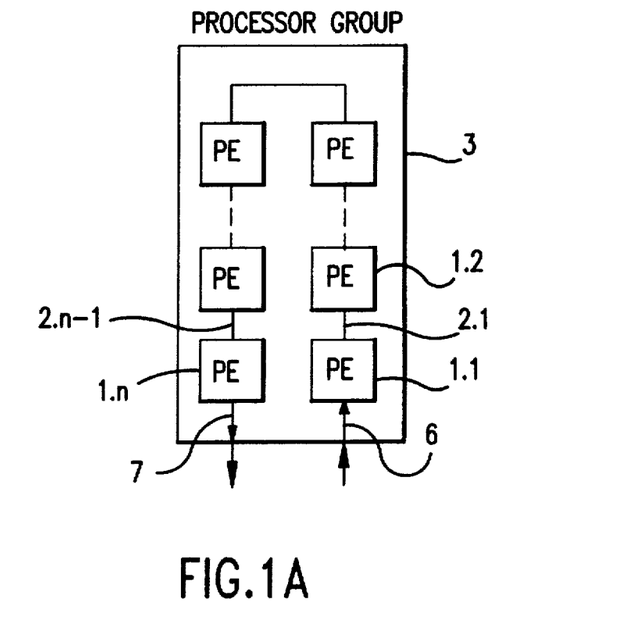
FIGS. 1A through 1D are schematic block diagrams of a ring bus multiprocessor system practiced as a first embodiment of the invention.

FIG. 1A depicts the structure of one processor group 3. This processor group is constituted by processors (processing elements, PEs) 1.1 through 1.n serially interconnected on a processor board by means of communication buses 2.1 through 2.n–1. If one processor constitutes a processor group, the input and output terminals of that single processor double as the input and output terminals of the processor group because there is no other processor to be connected in series. The processors at both extreme ends of the processor group 3 constitute an input terminal 6 and an output terminal 7 of that group. In the setup of FIG. 1A, the input of the processor 1.1 serves as the input terminal 6 and the output of the processor 1.n acts as the output terminal 7. The input terminal 6 and output terminal 7 are preferably located on the same edge of the processor board.

Figure 1B:
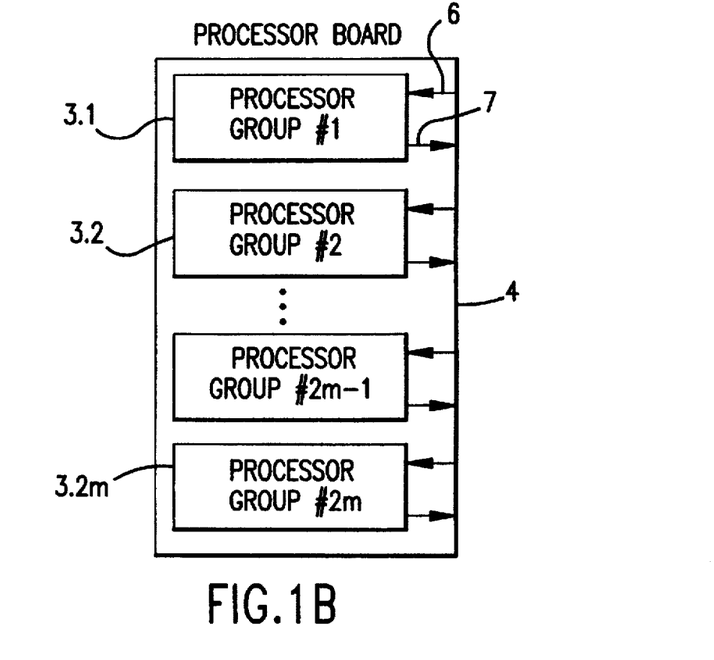

FIG. 1B shows the structure of one processor board 4. The processor board 4 comprises an even-numbered plurality of processor groups 3.1 through 3.2m. The input terminal 6 and output terminal 7 of each of the processor groups 3.1 through 3.2m are located on the same edge of the processor board 4.

Figure 1C:
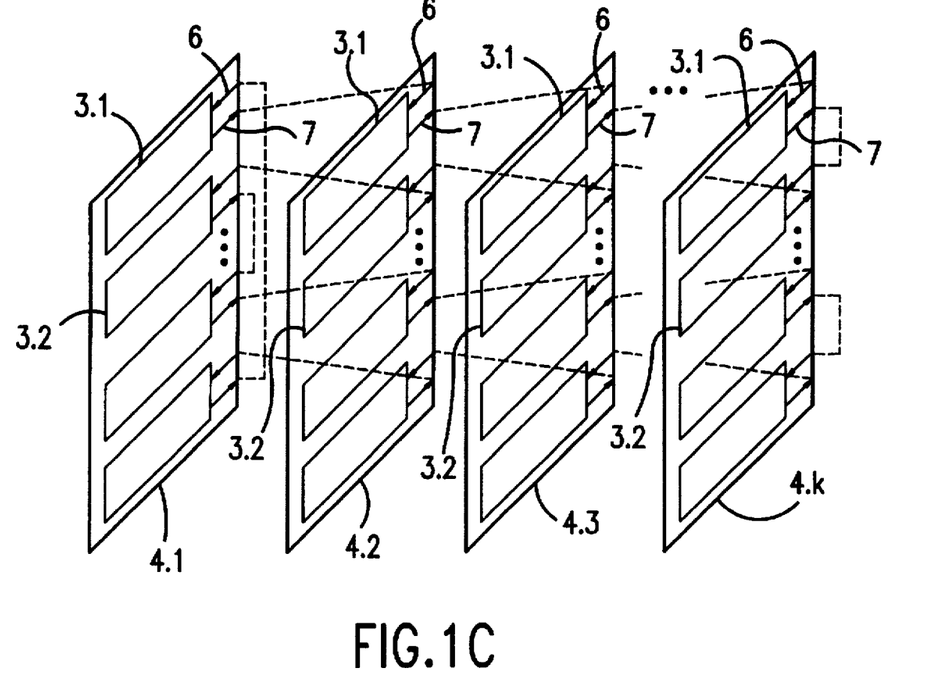
Figure 1D:
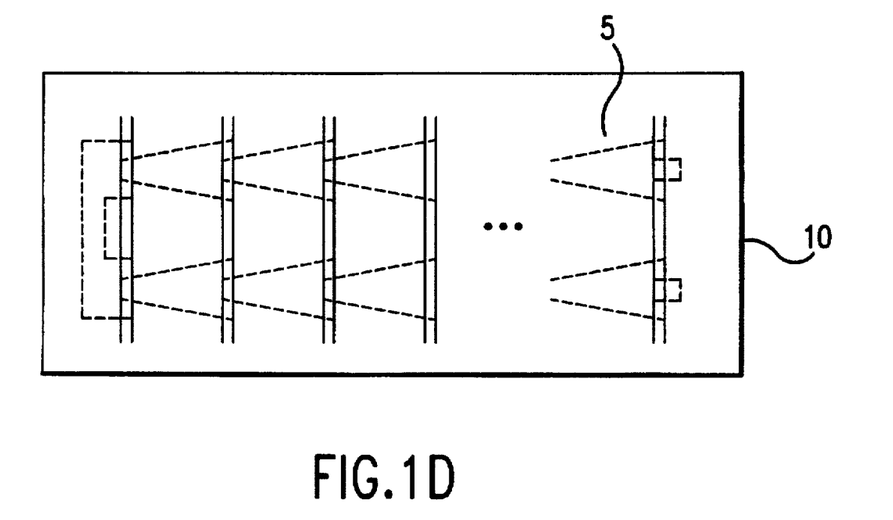

FIG. 1C illustrates a ring bus multiprocessor system model constituted by as many as k processor boards 4. That is, the k processor boards 4, one of which is shown in FIG. 1B, are laid out in parallel and are interconnected by means of inter-processor communication buses 5 on a back plane board 10 as in FIG. 1D.

In the example of FIG. 1C comprising processors 4.2 through 4.k–1, each of the processor groups 3.1 through 3.2m has its input terminal 6 and output terminal 7 connected respectively to the output terminal 7 and input terminal 6 of the same processor group on the adjacent processor board. Illustratively, the input terminal 6 of the processor group 3.1 on the processor board 4.2 is connected to the output terminal 7 of the processor group 3.1 on the processor board 4.1, and the output terminal 7 of the processor group 3.1 on the processor board 4.2 is connected to the input terminal 6 of the processor group 3.1 on the processor board 4.3. Likewise, the input terminal 6 of the processor group 3.2 on the processor board 4.2 is connected to the output terminal 7 of the processor group 3.2 on the processor board 4.3, and the output terminal 7 of the processor group 3.1 on the processor board 4.2 is connected to the input terminal 6 of the processor group 3.2 on the processor board 4.1. In this example, as described, the odd-numbered processor groups are connected from left to right as viewed in the figure, and the even-numbered processor groups are connected from right to left.

On the processor board 4.k, each of the odd-numbered processor groups has its output terminal 7 connected to the input terminal 6 of the adjacent even-numbered processor group. On the processor board 4.1, each of the even-numbered processor groups has its output terminal 7 connected to the input terminal 6 of the adjacent odd-numbered processor group, and the output terminal 7 of the processor group 3.2m is connected to the input terminal 6 of the processor group 3.1.

With the above connections in place, each of the odd-numbered processor groups is connected from one processor board to the next up to the processor board 4.k where the connection is looped back to the adjacent even-numbered processor group. In turn, the even-numbered processor group is connected from one processor board to the next to the processor board 4.1 where the connection is again looped back to the adjacent odd-numbered processor group, and so on. When connected in such a ring-like manner, the processors constitute a ring bus multiprocessor system such as the one in FIG. 5 in which n×2m×k processors are connected by unidirectional inter-processor communication buses.

The processor boards are interconnected only between physically adjacent boards. It follows that there is no need inordinately to elongate the wiring on the back plane board for connecting the processor boards. This prevents decline in system performance and allows the system to operate in stable fashion. In addition, the simplified structure of connection between the processor boards facilitates designing of the back plane board.

The processor boards 4.1 through 4.k may or may not be identical in constitution. However, if the processor boards are standardized to have the same constitution, as shown in FIG. 1C, that can lower the design and manufacturing costs of the system. Likewise, the processor groups on the processor boards may or may not be identical in constitution.

But if the processor groups are arranged to share the same constitution, design work is made easier. It is not mandatory for the number of processors per processor group to be the same for all processor groups configured.

Figure 2A:
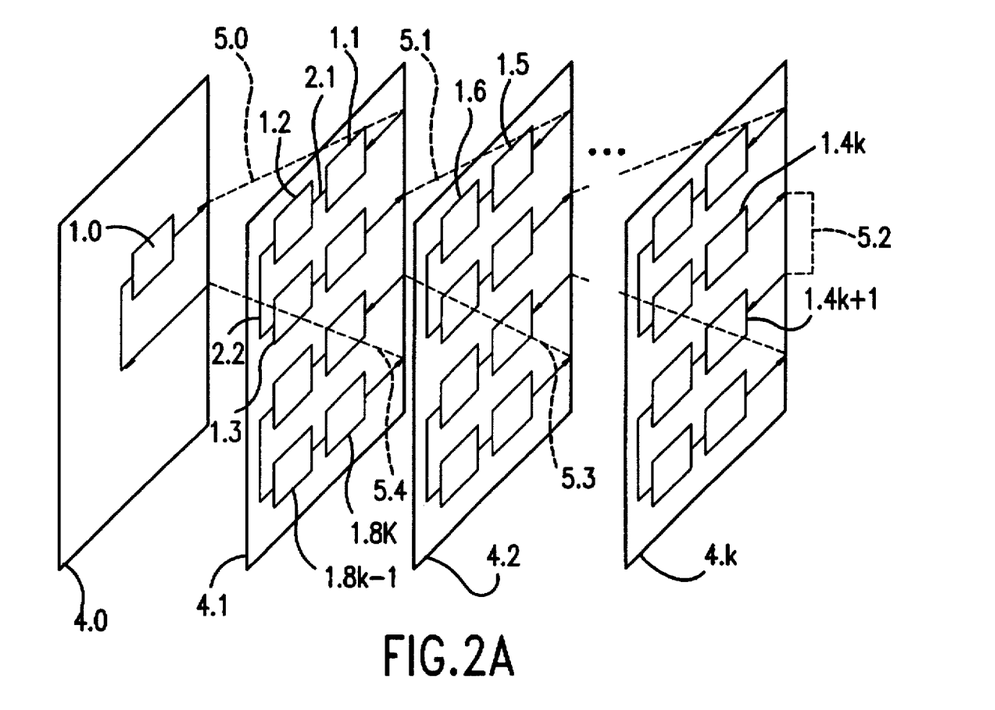
FIGS. 2A and 2B are concrete model views of a ring bus multiprocessor system practiced as a second embodiment of the invention.
Figure 2B:
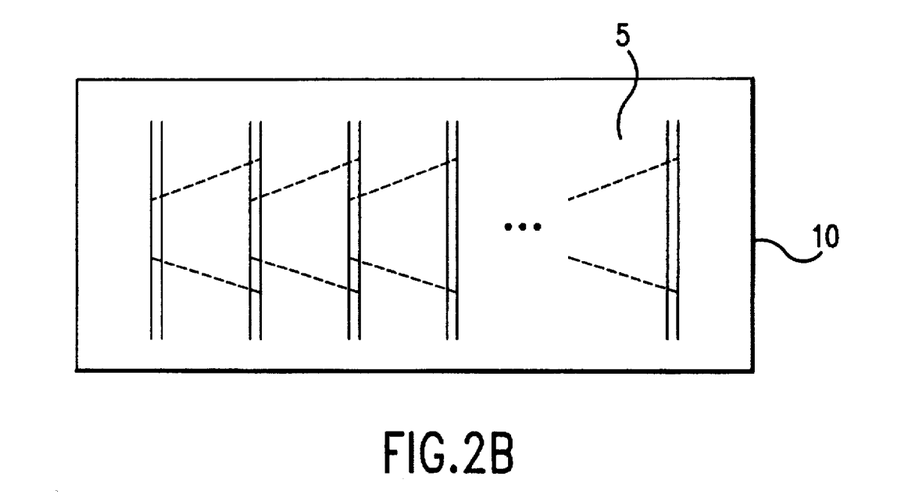

FIGS. 2A and 2B are concrete model views of a ring bus multiprocessor system practiced as the second embodiment of the invention. In FIGS. 2A and 2B, those parts with their counterparts already shown in any of FIGS. 1A through 1D are given the same reference numerals, and descriptions of the parts are omitted where they are repetitive. Reference numeral 1.0 is a master processor, 4.0 is a processor board, and 5.0 through 5.4 are inter-processor communication buses. The second embodiment represents a setup in which one master processor 1.0 and 8k processors 1.1 through 1.8k are connected in a ring-like manner. The master processor 1.0 and the processor board 4.0 for accommodating the master processor have specialized interfaces for exchanging necessary instructions and data with a host computer.

Each of the configured processor groups has four slave processors. Each processor board has two processor groups mounted thereon. Thus one processor board has a total of eight slave processors. The processor board 4.0 with only the master processor 1.0 mounted thereon and the processor boards 4.1 through 4.k for accommodating the slave processors are laid out in parallel.

The output terminal 7 of the master processor 1.0 is connected to the input terminal 6 of the processor 1.1 on the processor board 4.1 by means of the inter-processor communication bus 5.0. The output terminal 7 of the processor 1.4 is connected to the input terminal 6 of the processor 1.5 on the processor board 4.2 via the inter-processor communication bus 5.1. All processor boards are interconnected in like manner by means of inter-processor communication buses, until the input terminal 6 of the processor 1.4k–3 on the processor board 4.k is reached. The output terminal 7 of the processor 1.4k is connected to the input terminal 6 of the processor 1.4k+1 on the same processor board 4.k by means of the inter-processor communication bus 5.2 in a loop back manner. The output terminal 7 of the processor 1.4k+4 is connected successively to the input terminal 6 of the processor 1.4k+5 on the processor board 4.k–1, until the processor board 4.1 is reached. The output terminal 7 of the processor 1.8k on the processor board 4.1 is connected to the input of the master processor 1.0 on the master processor board 4.0. The setup above connects the master processor 1.0 and the processor elements 4.1 through 4.8k in ring-like fashion, thereby making up a ring bus arrangement. These processor boards may be interconnected by use of a back plane board. In this example, the loop back operation of signals on the most upstream processor board is effected by the processor board 4.0 and the master processor 1.0.

Below is a description of how signals are transmitted and received across the processors. Upon receipt of a request from the host computer, the master processor 1.0 transmits its signal to the processor 1.1 on the processor board 4.1 via the inter-processor communication bus 5.0 on the back plane board. The signal sent from the processor 1.1 is received by the processor 1.2 via the inter-processor communication bus 2.1 on the processor board 4.1. The signal transmitted by the processor 1.2 is received by the processor 1.3 via the inter-processor communication bus 2.2 and is further received by the processor 1.4. In this manner, each of the processors within the same processor group communicates only unidirectionally with the adjacent processor.

The signal sent from the processor 1.4 is received by the processor 1.5 on the adjacent processor board 4.2 via the inter-processor communication bus 5.1 on the back plane board. In like manner, the signal is forwarded up to the processor 1.4k on the most downstream processor board 4.k. The signal transmitted by the processor 1.4k is received by the processor 1.4k+1 of another processor group on the same processor board 4.k by means of the communication bus 5.2 on the back plane board. The signal is thus passed on successively from the processor board 4.k to the processor board 4.1 on which the processor 1.8k receives the forwarded signal. The signal sent from the processor 1.8k is received by the master processor 1.0 on the processor board 4.0 via the communication bus 5.4 on the back plane board. In the manner described, all processors 1.0 through 1.8k can exchange data with one another.

Figure 3:
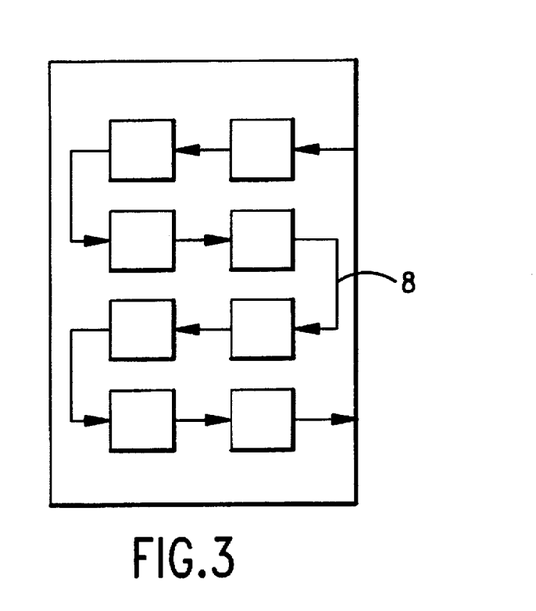
FIG. 3 is a schematic view of a variation of a processor board 4.k used in the second embodiment.

FIG. 3 is a schematic view of a variation of the processor board 4.k used in the second embodiment. In FIG. 3, reference numeral 8 denotes an inter-processor communication bus. On the processor board 4.k in the setup of FIG. 2A, the output terminal 7 of the processor 1.4k is connected via the back plane board to the input terminal 6 of the processor 1.4k+1. In that setup, the inter-processor communication bus 5.2 requires a wiring pattern different from that of the other buses on the back plane board. This requirement can be bypassed by the arrangement of the processor board 4.k in FIG. 3, the processor board 4.k accommodating the inter-processor communication bus 8 to connect the output terminal 7 of the processor 1.4k to the input terminal 6 of the processor 1.4k+1. That is, the back plane board need only accommodate the inter-processor communication buses 5 for connecting the processor boards, as shown in FIG. 2B. Because a fixed bus wiring pattern is repeated on the back plane board, the latter is very simple to redesign for any subsequent expansion of the system.

Alternatively, a wiring pattern is prepared beforehand so that a processor board or boards may be added to the configuration of the system in the event of its expansion and that a processor board or boards may be removed from the configuration for system reduction. This arrangement makes it possible, after the system is established, to increase or decrease the number of configured processor boards without redesigning the back plane board or other associated components. Where the scale of the system is to be varied, the most downstream processor board in the initial setup must remain in the most downstream location after system expansion or reduction.

Figures 4A, 4B:
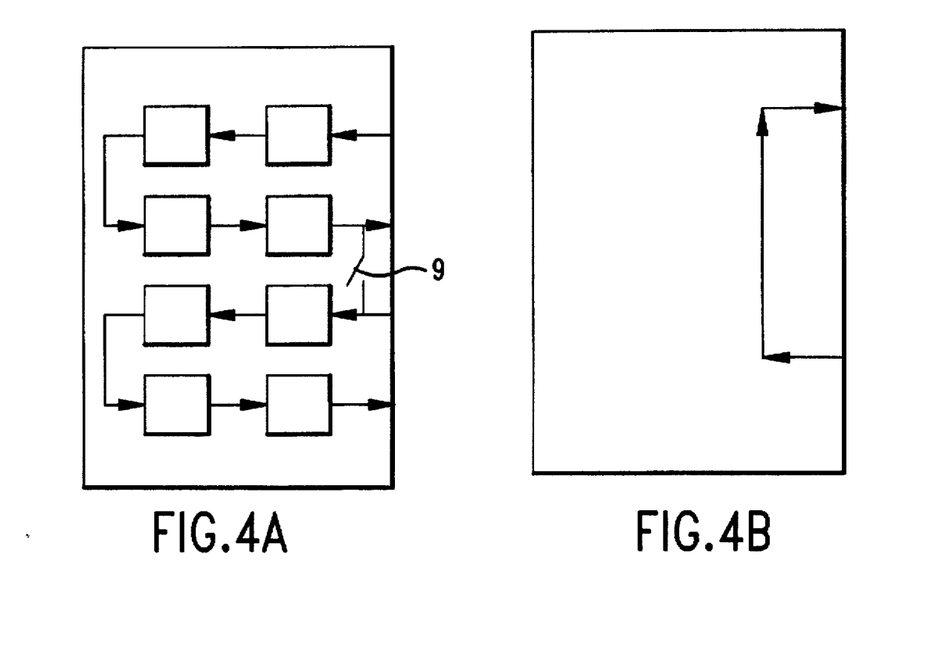
FIGS. 4A and 4B are schematic views of another processor board variation used in the second embodiment.

FIGS. 4A and 4B are schematic views of another processor board variation used in the second embodiment. In FIG. 4A, reference numeral 9 denotes a switch. Where processor boards of the type shown FIG. 3 are used to constitute a system, one processor board 4.k needs to have a constitution different from that of the other processor boards configured. Using more processor board types lead to higher processor board costs. On the typical processor board depicted in FIG. 4A, a switch 9 (e.g., DIP switch) is installed interposingly between the output terminal 7 of one processor group and the input terminal 6 of the adjacent processor group. Where processor boards of the type shown in FIG. 4A are used to constitute a system, the most downstream processor board such as the processor board 4.k in FIG. 2A has its switch 9 closed, and the switches 9 of the other processor boards are left open.

In the preceding setup, all processor boards accommodating slave processors may be of an identical constitution. A system of a desired scale can be established by configuring as many processor boards as needed and by simply closing the switch 9 on the most downstream processor board. This arrangement allows the system configuration to be expanded without increasing the number of processor board types, thus holding the cost of processor board design low. Since any of the configured processor boards may be freely replaced as needed, it is easy to service the system in case of trouble. Alternatively, a board with no processor mounted thereon may have its input and output terminals directly connected as shown in FIG. 4B, and may be used as each of the processor boards at both extreme ends of the configured processor boards. The examples depicted in FIGS. 3, 4A and 4B may also be applied to the first embodiment. As another alternative, the back plane board 10 may accommodate wiring for directly connecting the input and output terminals of the processor group on the processor board at one of both extreme ends of the processor boards, and the other extreme-end processor board may be any one of the boards shown in FIGS. 3, 4A and 4B.

As described and according to the invention, the configured processor boards of the system are connected by inter-processor communication buses only between adjacent boards. This all but eliminates the dispersion of the physical lengths of the inter-processor communication buses and thereby enhances the stability of the system. Because the wiring lengths between the processor boards are minimized, the performance of the system is improved. When a wiring arrangement that determines the most downstream processor board is allowed to be furnished on a given processor board, the scale of the system can be modified easily and at low cost without the need for redesigning the back plane board. Where that wiring arrangement is in the form of a switch, all processor boards may be standardized to have the same constitution. This lowers the design and manufacturing costs of the system.

While preferred embodiments of the invention have been described using specific terms, such description is for illustrative purposes only, and it is to be understood that changes and variations may be made without departing from the spirit or scope of the following claims.

What is claimed is:

1. A processor board for a ring bus multiprocessor system comprising:

a board; and an even number of processor groups wherein each of said processor groups has at least one processor and only one pair of an input terminal and an output terminal on an edge of said board to transmit data processed by said at least one processor, and if said processor group has a plurality of processors, said processors of said processor group are serially interconnected.

2. A processor board for a ring bus multiprocessor system according to claim 1, wherein said pair of an input terminal and an output terminal are located on a same edge of said board.

3. A processor board for a ring bus multiprocessor system according to claim 2, said pair of an input terminal and an output terminal of said even number of processor groups are arranged to be neighbored each other.

4. A processor board for a ring bus multiprocessor system according to claim 1, further comprising a switch interposed between said processor groups and being used to make and break the connection between said input terminal of one of said processor groups and said output terminal of the other of said processor groups.

5. A ring bus multiprocessor system comprising:

a plurality of processor board for a ring bus multiprocessor system including a board and an even number of processor groups wherein each of said processor groups has at least one processor and only one pair of an input terminal and an output terminal on an edge of said board to transmit data processed by said at least one processor, and if said processor group has a plurality of processors, said processors of said processor group are serially interconnected;

a group of wiring interposed between two adjacent processor boards of said plurality of processor boards and connecting said output terminal of one of said two adjacent processor boards and said input terminal of the other of said two adjacent processor boards; and an end wiring interposed between an output terminal of one of said processor groups and an input terminal of the other of said processor group of each of said processors boards located at each side of said plurality of said processor boards;

wherein said processors included in said plurality of processor boards are interconnected to furnish a ring bus arrangement.

6. A ring bus multiprocessor system according to claim 5, at least one of said end wiring is arranged on a back plane board for holding said plurality of processor boards.

7. A ring bus multiprocessor system according to claim 6, another end wiring is arranged on said processor board located at the side of said plurality of said processor boards.

8. A ring bus multiprocessor system according to claim 5, at least one of end wiring is arranged on said processor board located at the side of said plurality of said processor boards.

9. A ring bus multiprocessor system according to claim 5, at least one of said processor board located at the side of said plurality of said processor boards further comprising a switch interposed between said processor groups and being used to make and break the connection between said input terminal of one of said processor groups and said output terminal of the other of said processor groups.

10. A ring bus multiprocessor system according to claim 5, said processor board further including a switch interposed between said processor groups and being used to make and break the connection between said input terminal of one of said processor groups and said output terminal of the other of said processor groups and said switches of locating at each side of said plurality of said processor boards are turned on and said switch of the other processor board is turned off.

11. A ring bus multiprocessor system according to claim 5, further comprising a terminal board neighboring to at least one side of said plurality of processor boards;

wherein at least one of said end wiring are arranged on said terminal board and connecting said input terminal and output terminal of said processor board located at the side of said plurality of said processor boards directly or interposing a processor on said terminal board.

12. A ring bus multiprocessor system according to claim 11, another end wiring is arranged on another side of said plurality of processor boards.

13. A ring bus multiprocessor system comprising: a first processor board including a board and 2M of processor groups wherein each of said processor groups has at least one processor and only one pair of an input terminal and an output terminal on an edge of said board to transmit data processed by said at least one processor, and if said processor group has a plurality of processors, said processors of said processor group are serially interconnected, and said first processor board having (M+N) of input terminals and output terminals, therefore said input terminal of one of (M−N) of said processor groups are connected to said output terminals of the other of (M−N) of processor groups , M is a natural number and N is at least 0 and not more than M;

a second processor board neighboring to said first processor board and including 2M of said processor group;

a third processor board neighboring to said first processor board and including 2M of said processor group and having M of input terminals and output terminals by interconnecting M of said processor group each;

a back plane board having connection lines for connecting input terminals and output terminals of said first processor board to output terminals and input terminals of said second processor board and connecting input terminals and output terminals of said second processor board to output terminals and input terminals of said third processor board ;

an end wiring connecting N of input terminals and output terminals of said first processor board , not being connected to output terminal or input terminal of said first processor board, directly or by way of a predetermined number of processor groups.

* * * * *